United States Patent [19]

Reunamäki et al.

[11] Patent Number: 4,712,086
[45] Date of Patent: Dec. 8, 1987

[54] SUPPORT FRAME FOR RESISTOR ELEMENTS IN A HEATING FURNACE FOR GLASS SHEETS

[75] Inventors: Pauli T. Reunamäki, Nattari; Erkki P. J. Yli-Vakkuri; Kauko K. Anttonen, both of Tampere, all of Finland

[73] Assignee: O/Y Kyro A/B Tamglass, Tampere, Finland

[21] Appl. No.: 809,340

[22] Filed: Dec. 16, 1985

[30] Foreign Application Priority Data

Jan. 3, 1985 [FI] Finland .................................. 850025

[51] Int. Cl.⁴ ............................ F27B 9/06; F27B 9/30
[52] U.S. Cl. ..................................... 338/315; 338/316; 373/128; 219/532; 219/546; 219/550
[58] Field of Search ...................... 219/532, 546, 550; 338/315, 316, 321; 373/127–130

[56] References Cited

U.S. PATENT DOCUMENTS

| | | |
|---|---|---|
| 1,715,018 | 5/1929 | Von Brockdorf . |
| 1,884,232 | 10/1932 | Rehm . |
| 2,022,466 | 11/1935 | Hess .................................. 219/550 |
| 2,424,780 | 7/1947 | Trent ............................ 373/128 X |
| 2,571,422 | 10/1951 | Cole et al. . |
| 3,217,279 | 11/1965 | Boggs ............................ 219/550 X |
| 3,387,116 | 6/1968 | Dupuis . |
| 3,818,181 | 6/1974 | Benard . |
| 3,846,621 | 11/1974 | Roos .................................. 219/550 |
| 4,401,883 | 8/1983 | Watson .............................. 219/381 |
| 4,464,565 | 8/1984 | Spangler ............................ 219/550 |
| 4,475,030 | 10/1984 | Bailey ................................ 219/270 |

FOREIGN PATENT DOCUMENTS

| | | | |
|---|---|---|---|
| 1948724 | 4/1971 | Fed. Rep. of Germany . | |
| 0405444 | 12/1945 | Italy .................................. | 373/128 |
| 8102131 | 11/1981 | Netherlands . | |
| 0345874 | 4/1931 | United Kingdom ................ | 373/130 |
| 729072 | 5/1955 | United Kingdom . | |
| 0587647 | 1/1978 | U.S.S.R. ............................ | 338/316 |

Primary Examiner—Howard N. Goldberg
Assistant Examiner—T. Ross
Attorney, Agent, or Firm—Burns, Doane, Swecker & Mathis

[57] ABSTRACT

The invention relates to a support frame for a resistor element in a heating furnace for glass sheets, said flame providing a substantially continuously extending, elongated rest surface for a resistor element. The support frame elements consist of trough-like castings and are fastened to each other in an articulated manner. The short frame elements are easy to cast and can be assembled into long continuous support frames for resistor elements, the thermal stresses of said frames not passing over the link points. A long continuous support frame structure makes it accordingly possible to employ resistor elements that are long and continuous and thus readily replaceable.

9 Claims, 9 Drawing Figures

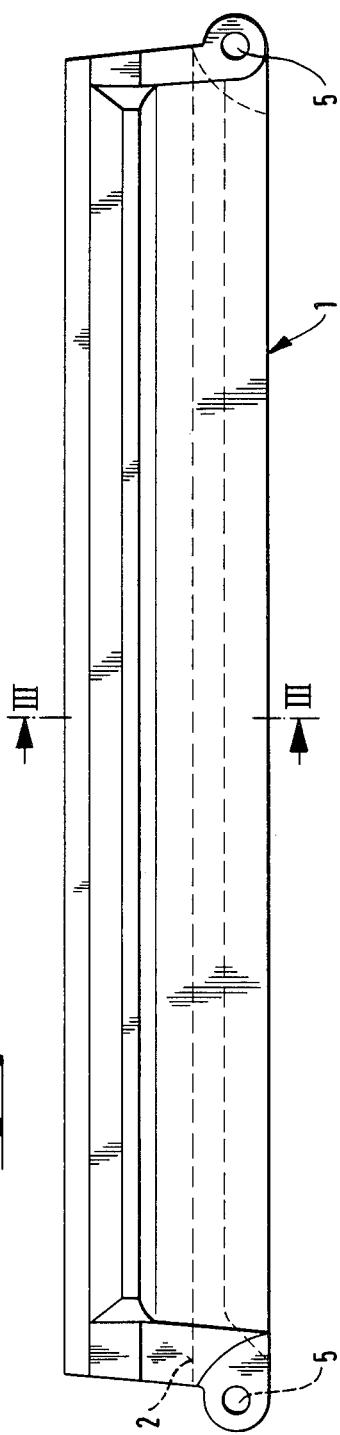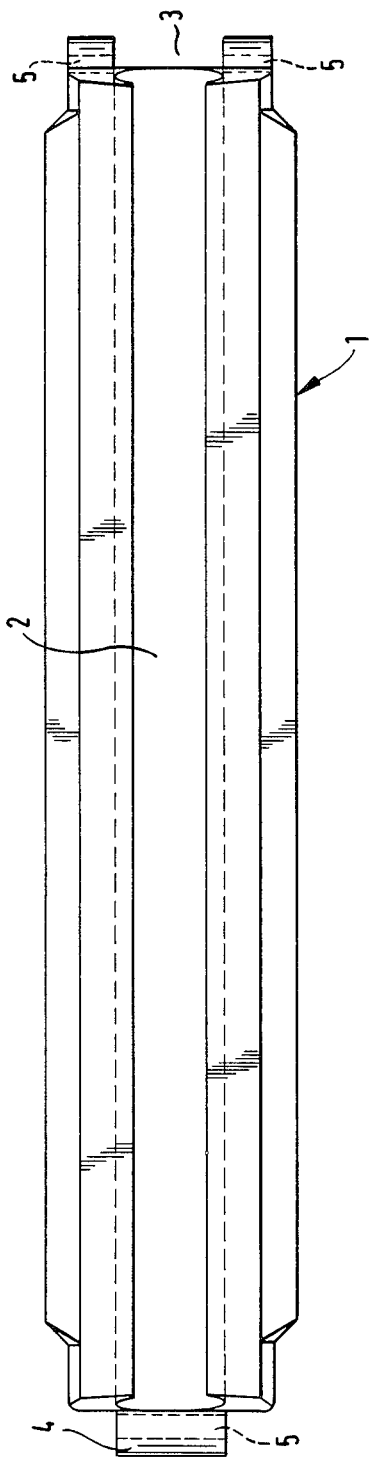

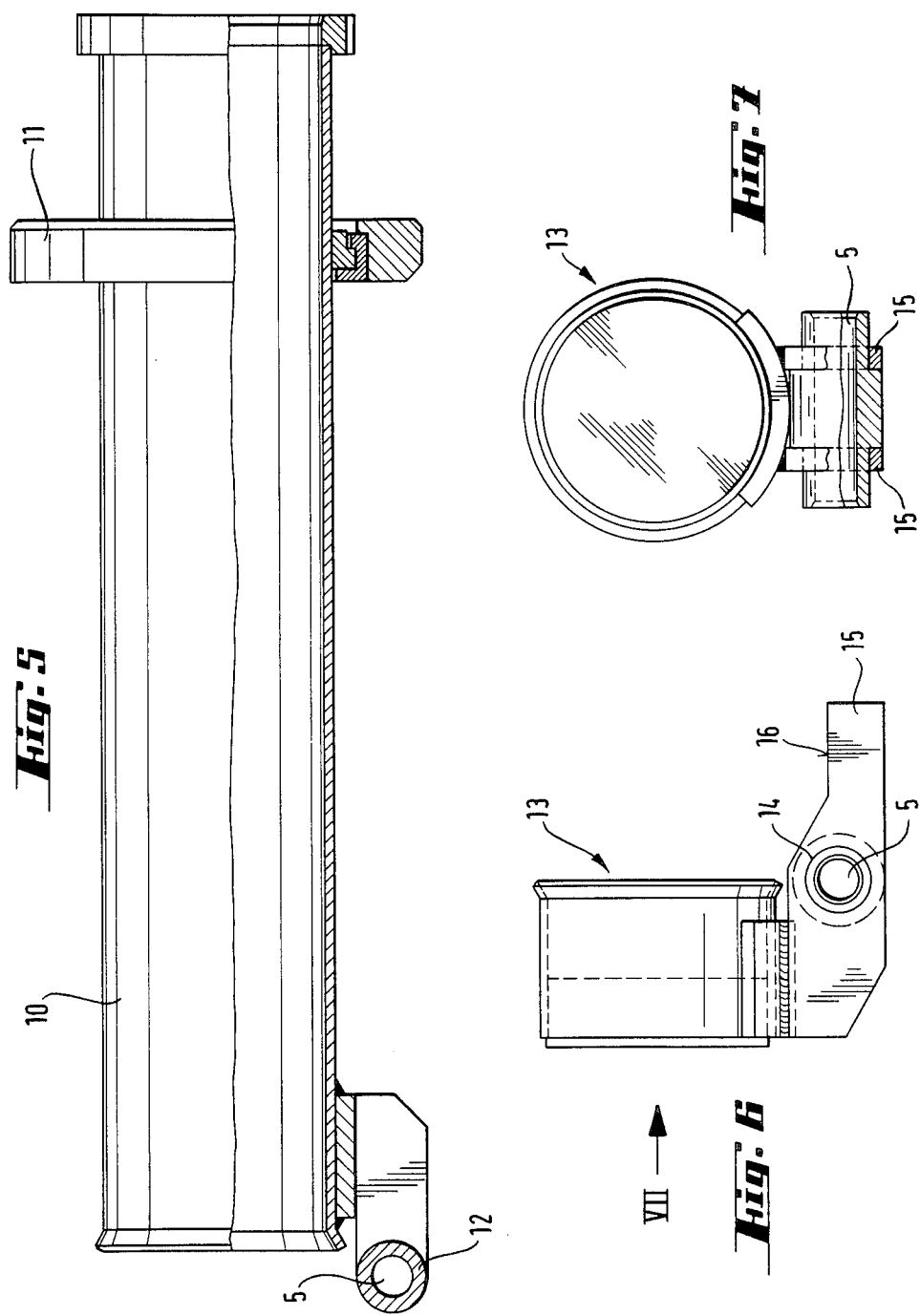

SUPPORT FRAME FOR RESISTOR ELEMENTS IN A HEATING FURNACE FOR GLASS SHEETS

BACKGROUND AND SUMMARY OF THE INVENTION

The present invention relates to a support frame for resistor elements in a heating furnace for glass sheets, said frame providing a substantially continuous, elongated rest surface for a resistor element. The available resistor element support frames are manufactured for a certain, predetermined resistor element length, a furnace being lengthwise fitted with a plurality of separate arrays of resistor elements with their support frames. A resistor cannot be replaced until a furnace is cooled which means a long down-time. There will be a large number of separate resistor elements.

An object of the invention is to provide a novel support frame for resistor elements for eliminating the above drawbacks.

According to the invention, this object is accomplished by fastening the separate support frame elements to each other by means of links. The support frame elements are preferably trough-like castings.

This solution offers several significant advantages. It is possible to cast short frame elements for easier casting.

The short frame elements can be assembled into long continuous support frames.

Inside a support frame will be formed a continuous tube or trough for inserting a resistor element therein from the end of said tube or trough.

Replacement of a resistor element is easy without cooling the furnace.

The number of separate resistor elements is substantially reduced (e.g. in a tempering furnace ⅓ of the present number).

BRIEF DESCRIPTION OF THE DRAWINGS

One embodiment of the invention will now be described in more detail with reference made to the accompanying drawings, in which:

FIG. 1 shows a support frame element of the invention in side view;

FIG. 2 shows the same element in plan view;

FIG. 5 shows a support frame element mounted on the end of a support frame for leading through the wall of a furnace;

FIGS. 6 and 7 are side and front views respectively of the rear end member of a support frame;

DETAILED DESCRIPTION OF A PREFERRED EMBODIMENT

Figure 3:
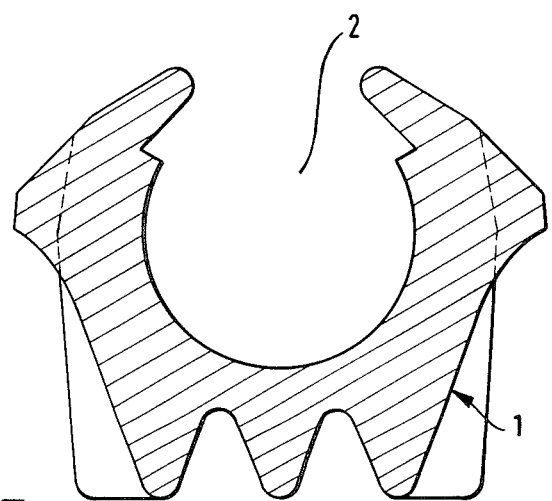
FIG. 3 is a cross-section of the element shown in FIGS. 1 and 2.
Figure 4:
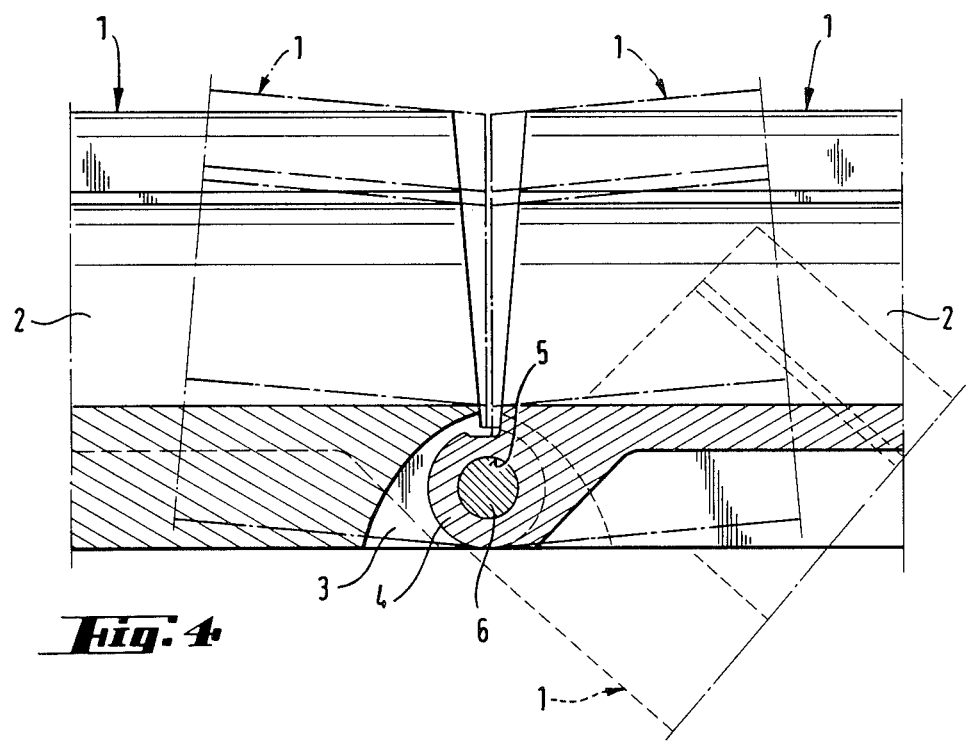
FIG. 4 is a sectional view of a link member between the frame elements.

A support frame for carrying resistor elements (not shown) comprises separate support frame elements 1 with a trough-like or tubular space 2 being formed therein. One end of each frame element 1 is provided with a runner 3 fit for a bracket 4 at the other end of a frame element. Drilled in the overlapping parts of runner 3 and bracket 4 is a hole 5 which is fit for a pin 6. A support frame of desired length is obtained by linking successively a desired number of frame elements 1.

Figure 8:
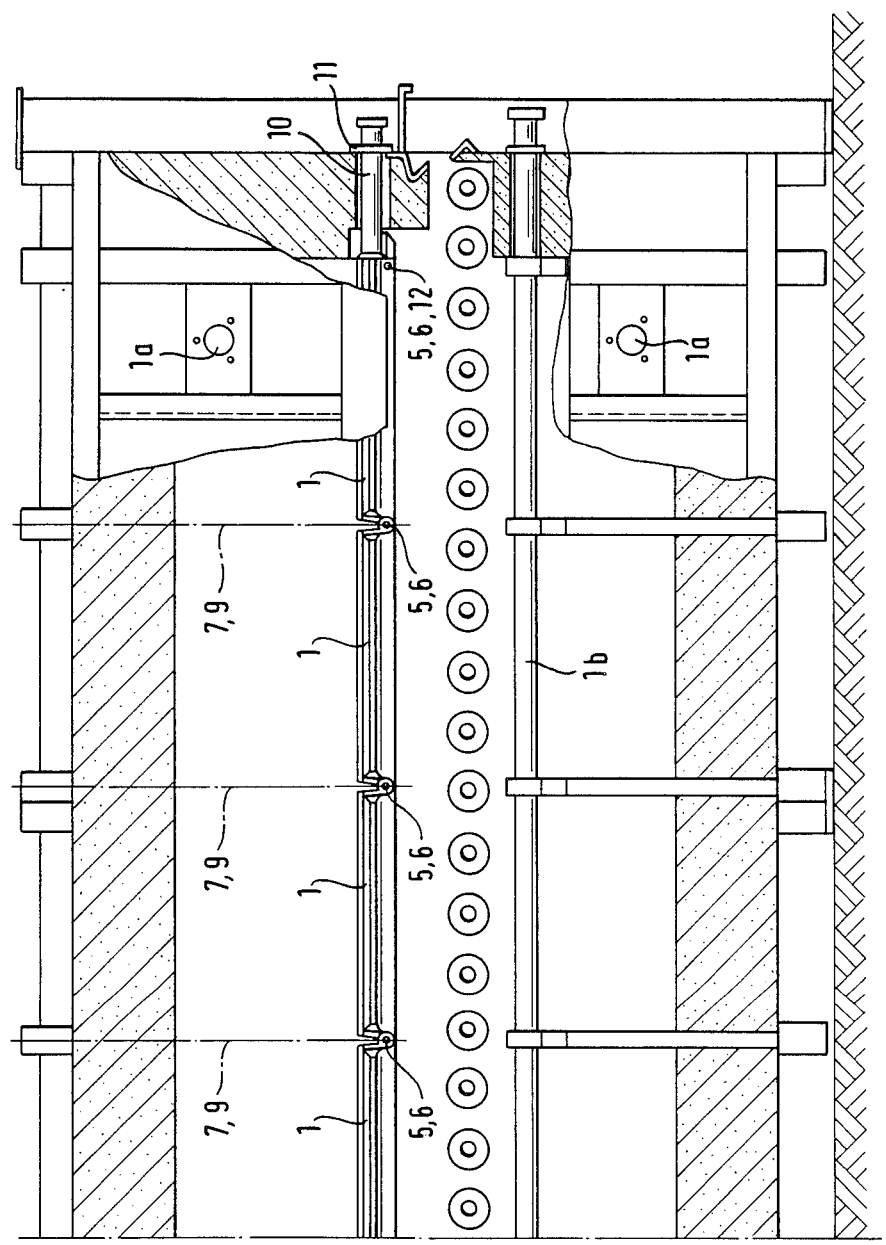
FIG. 8 is a side view of the end section of a glass tempering furnace, wherein a support frame for resistor elements of the invention is used for supporting the resistor elements mounted above the glass sheet supporting rollers.
Figure 9:
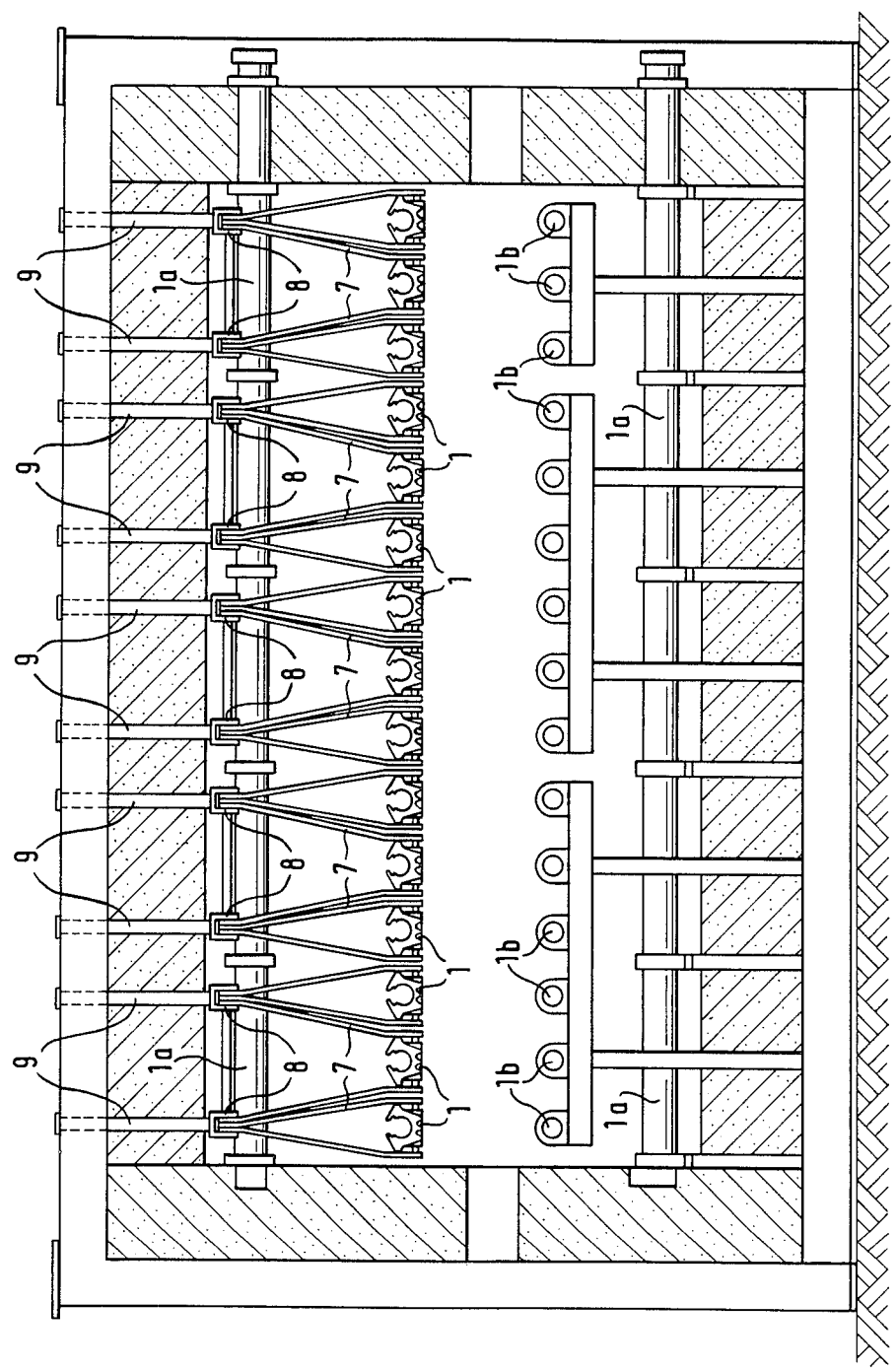
FIG. 9 is an end view of the tempering furnace shown in FIG. 8 showing in more detail the mounting of laterally parallel support frames on the ceiling of a furnace.

The support frames are placed side by side in the lateral direction of a furnace so as to cover substantially the entire length of a furnace (see FIGS. 8 and 9). The support frames are mounted in suspension by means of bearing rails 7 fixed to the ends of articulated pins 6. The top ends of bearing rails 7 are fastened by means of a swing joint 8, which is inside the furnace, to suspension rods 9 passed through the furnace ceiling. Thus, the support frames are free to perform thermal expansion movement without causing mechanical stress or heat runoffs on the suspension lead-in.

FIG. 5 shows an end element 10 for the leading engd of a support frame and for effecting penetration through the end wall of a furnace. Said end element 10 is tubular and fitted with an attachment flange 11 for fastening to the end wall of a furance. Said element 10 is further fitted with a sleeve 12 provided with a hole 5 for a hole/articulared pin joit 5, 6 with the next frame element 1.

The rear end of a support frame, i.e. the opposite end of a furnace, is fitted by means of the hole/pin link 14, 5, 6 with an end member 13, which serves as an end stop for a resistor element (not shown) inserted in the tubular space 2 of a support frame. The swinging of end member 13 is prevented by means of a protrusion 15 whose top surface 16 leans against the bottom surface of frame element 1.

By selecting the length of support frame elements in a manner to match the distance between the link and bearing points set between the ceramic elements of a resistor element carried by said frame, it is possible to make sure that the deformations caused by thermal expansion do not significantly change the distance between resistance wire and support frame. Hence, the articulated element structure of the invention also contributes to safety in operation.

The invention is by no means limited to the above embodiment but, instead, the details can be modified in many ways within the scope of occupational skill and nevertheless exploiting the invention set forth in the annexed claims. For example, the articulated joint can be designed by sing any prior known link or appliction of a prior known link. In some cases, it may be preferable to make the fastening ends of support frame elements mutually alike, which requires two types of frame elements as far as their fastening ends are concerned.

In the described case, the frame elements of the invention have been used for overhead resistors extending lengthwise of a furance. In addition, FIGS. 8 and 9 show the crosswise overhead and bottom resistors 1a and lengthwise bottom resistors 1b of a furnace. The frame elements of the invention have not been used for the latter.

We claim:

1. A support frame for resistor elements in a heating furnace for glass sheets, said frame being mounted in suspension and comprising a plurality of support frame elements each having an elongated rest surface and connection means for connecting each of the support frame elements to adjacent support frame elements in an articulatory end-to-end arrangement in which the articulation of the elements occurs around axes in the horizontal plane, the plurality of elongated rest surfaces being aligned to form a substantially continuous resistor element support.

2. A support frame as set forth in claim 1, wherein said support frame elements are trough-like castings.

3. A support frame as set forth in claim 1, wherein said connection means of each of said support frame elements are alike.

4. A support frame as set forth in claim 1, wherein each of said support frame elements includes a first end and a second end, said first end being provided with a runner and said second end being provided with a bracket adapted to fit in said runner.

5. A support frame as set forth in claim 1, further comprising a leading end element which is tubular and includes an attachment flange for fastening said leading end element to an end wall of the furnace, means for connecting said leading end element to an adjacent support frame element to form an articulated joint.

6. A support frame as set forth in claim 1, further comprising a rear end element including means for connecting said rear end element to an adjacent support frame element, and a protrusion adjacent said connection means to prevent swinging movement between said rear end element and said adjacent support frame element, said rear end element including an end stop for a resistor element inserted in said resistor element support of the support frame.

7. A support frame as set forth in claim 1, wherein each connection means includes a hole-and-pin joint.

8. A support frame as set forth in claim 7, further comprising brackets which grip the pins of said hole-and-pin joints to mount the support frame in suspension.

9. A support frame as set forth in claim 8, wherein the furnace has a ceiling and the suspension includes suspension rods extending through the ceiling, each of said suspension rods being connected to a swing joint which is fastened to one of said brackets.

* * * * *